United States Patent
Mayer et al.

(10) Patent No.: US 11,402,463 B2
(45) Date of Patent: Aug. 2, 2022

(54) RADAR SENSOR SYSTEM AND METHOD FOR OPERATING A RADAR SENSOR SYSTEM

(71) Applicant: Robert Bosch GmbH, Stuttgart (DE)

(72) Inventors: Marcel Mayer, Lonsee (DE); Klaus Baur, Mietingen (DE); Michael Schoor, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 130 days.

(21) Appl. No.: 16/964,672

(22) PCT Filed: Jan. 10, 2019

(86) PCT No.: PCT/EP2019/050600
§ 371 (c)(1),
(2) Date: Jul. 24, 2020

(87) PCT Pub. No.: WO2019/170304
PCT Pub. Date: Sep. 12, 2019

(65) Prior Publication Data
US 2020/0348394 A1    Nov. 5, 2020

(30) Foreign Application Priority Data

Mar. 8, 2018   (DE) .......................... 102018203464.8

(51) Int. Cl.
*G01S 7/03* (2006.01)
*G01S 13/87* (2006.01)
*G01S 13/931* (2020.01)

(52) U.S. Cl.
CPC .............. *G01S 7/032* (2013.01); *G01S 13/87* (2013.01); *G01S 13/931* (2013.01)

(58) Field of Classification Search
CPC . G01S 7/03; G01S 7/032; G01S 13/87; G01S 13/931
See application file for complete search history.

(56) References Cited

U.S. PATENT DOCUMENTS

| 9,880,261 B2 * | 1/2018 | Subburaj ................... H04L 7/04 |
| 10,061,016 B2 * | 8/2018 | Ginsburg .............. G01S 7/4008 |

(Continued)

FOREIGN PATENT DOCUMENTS

| DE | 102015218542 A1 | 3/2017 |
| JP | 2000349015 A | 12/2000 |

(Continued)

OTHER PUBLICATIONS

International Search Report for PCT/EP2019/050600, dated May 2, 2019.

*Primary Examiner* — Peter M Bythrow
(74) *Attorney, Agent, or Firm* — Norton Rose Fulbright US LLP; Gerard Messina

(57) ABSTRACT

A radar sensor system having a defined number of HF components, each HF component having at least one antenna for transmitting and/or receiving radar waves and at least one antenna control for operating the at least one antenna, and a synchronization network to which all HF components are functionally connected and via which an HF signal is able to be provided to all HF components. At least two HF components have a respective self-supply device for feeding back a defined share of power of the HF signal able to be fed into the synchronization network. The HF signal for all HF components being able to be generated by a defined HF component at a defined instant, the radar sensor system being able to be functionally subdivided into at least two sub-sensor systems.

7 Claims, 3 Drawing Sheets

(56) References Cited

U.S. PATENT DOCUMENTS

| | | | |
|---|---|---|---|
| 11,035,928 B2* | 6/2021 | Subburaj | G01S 13/87 |
| 2010/0171648 A1* | 7/2010 | Himmelstoss | H03L 7/16 |
| | | | 342/103 |
| 2011/0267217 A1* | 11/2011 | Hildebrandt | H01Q 21/24 |
| | | | 342/188 |
| 2015/0061925 A1* | 3/2015 | Hasch | G01S 7/02 |
| | | | 342/175 |
| 2016/0187464 A1* | 6/2016 | Ginsburg | G01S 7/032 |
| | | | 342/168 |
| 2016/0352388 A1* | 12/2016 | Lane | H04B 1/3822 |
| 2017/0023663 A1* | 1/2017 | Subburaj | G01S 7/032 |
| 2017/0090014 A1* | 3/2017 | Subburaj | G01S 7/4056 |
| 2017/0090015 A1* | 3/2017 | Breen | G01S 13/87 |
| 2017/0315211 A1* | 11/2017 | Subburaj | G01S 7/40 |
| 2018/0024233 A1* | 1/2018 | Searcy | G01S 7/032 |
| | | | 342/125 |
| 2019/0187273 A1* | 6/2019 | Tong | G01S 13/878 |
| 2019/0204846 A1* | 7/2019 | Reuter | G01S 7/03 |

FOREIGN PATENT DOCUMENTS

| | | | |
|---|---|---|---|
| JP | 2014506325 A | 3/2014 | |
| JP | 2017535757 A | 11/2017 | |
| WO | 2016054291 A1 | 4/2016 | |

* cited by examiner

RADAR SENSOR SYSTEM AND METHOD FOR OPERATING A RADAR SENSOR SYSTEM

FIELD

The present invention relates to a radar sensor system. In addition, the present invention relates to a method for operating a radar sensor system. The present invention also relates to a computer program product.

BACKGROUND INFORMATION

The market for driver-assistance systems is currently in transition. While it was mainly cost-effective sensor systems that stood in the foreground during the past few years, there is currently a trend toward highly autonomous driving with much greater demands on the sensor system. In vehicles that offer a high degree of driver-assistance functions or automated driving functions, an increasing number of sensors is installed for the control and regulation of the functions. The sensors installed in the vehicles can be radar sensors or lidar sensors, for instance, and must provide the highest accuracy possible. Through the use of precise sensors, the functional safety and the reliability of the autonomous or semi-autonomous driving functions are able to be ensured.

SUMMARY

It is an object of the present invention to provide a radar sensor system having a better operating characteristic.

According to a first aspect of the present invention, the object may be achieved by an example embodiment of the present invention. An example radar sensor system according to the present invention includes:
  a defined number of HF components, each HF component having at least one antenna for transmitting and/or receiving radar waves and at least one antenna control for operating the at least one antenna, and
  a synchronization network to which all HF components are functionally connected and via which an HF signal is able to be supplied to all HF components,
  at least two HF components having a respective self-supply device for feeding back a defined share of power of the HF signal able to be fed into the synchronization network, the HF signal for all HF components being able to be generated by a defined HF component at a defined instant,
  the radar sensor system being able to be functionally subdivided into at least two sub-sensor systems.

This provides a radar sensor system which has a synchronization network to which at least two "master capable" HF components are linked. However, because only a single master actually also functions as such at any given point in time, or in other words, supplies an HF signal to the synchronization network and thus for all HF components, greater redundancy of the entire system is realized. This is so because in the event of a malfunction of an HF component acting as the master, the failure safety is improved in that some other HF component assumes the function of the master. In addition, sub-sensors, which are able to be optionally operated in an autonomous manner, may be formed from the radar sensor system so that a defined capacity of the radar sensor system is provided.

In relation to the antennas of the HF components of the radar sensor system, symmetrical conditions are thereby achieved in an advantageous manner. This advantageously makes it possible for a master to act like a slave as far as the radar-technical main functionalities of transmitting and receiving are concerned.

According to a second aspect of the present invention, the object may be achieved by an example method according to the present invention. An example method according to the present invention for operating a radar sensor system, includes the following steps:
  Transmitting and receiving radar waves with the aid of a defined number of HF components using at least one antenna in each case; and
  synchronizing an HF operating frequency of the HF components using a synchronization network, which is connected to the HF components, only a single HF component feeding an HF signal into the synchronization network at a defined instant, and the HF component feeding in the HF signal returning a defined share of power of the HF signal to itself with the aid of a self-supply device.

Advantageous further developments of the radar sensor system are described herein.

One advantageous further development of the radar sensor system in accordance with the present invention includes that at least one of the following is additionally able to be provided to all HF components with the aid of the synchronization network: a trigger signal and a clock pulse signal. This supports a high coherence or synchronicity of all HF components that are part of the radar sensor system.

Another advantageous further development of the radar sensor system in accordance with the present invention provides that the self-supply device is embodied as a coupling device. This provides a type of "hybrid coupler" with the aid of which the power fed back by the master HF component is able to be dimensioned in an uncomplicated manner.

Another advantageous development of the radar sensor system in accordance with the present invention includes that the self-supply device is developed as a divider device. This advantageously provides an alternative feedback device which may possibly be easier to manufacture than the hybrid coupler.

Another advantageous further development of the radar sensor system in accordance with the present invention includes that the divider device is developed as a hollow conductor network. This provides a specific embodiment form of the divider device.

Another advantageous further development of the radar sensor system in accordance with the present invention includes that the self-supply device is developed in such a way that a defined power is able to be supplied to all HF components with the aid of the HF signal. High coherence or synchronicity of the HF components is able to be provided in this manner.

Another advantageous further development of the radar sensor system in accordance with the present invention includes that ports of the HF components are able to be configured as HF transmission ports or as HF receiving ports. This supports a great design freedom for the radar sensor system, and the transmission and receiving ports are adaptable to the specific requirements.

Below, preferred exemplary embodiments of the present invention are described in greater detail with the aid of heavily schematic representations in the figures.

Figure 1:
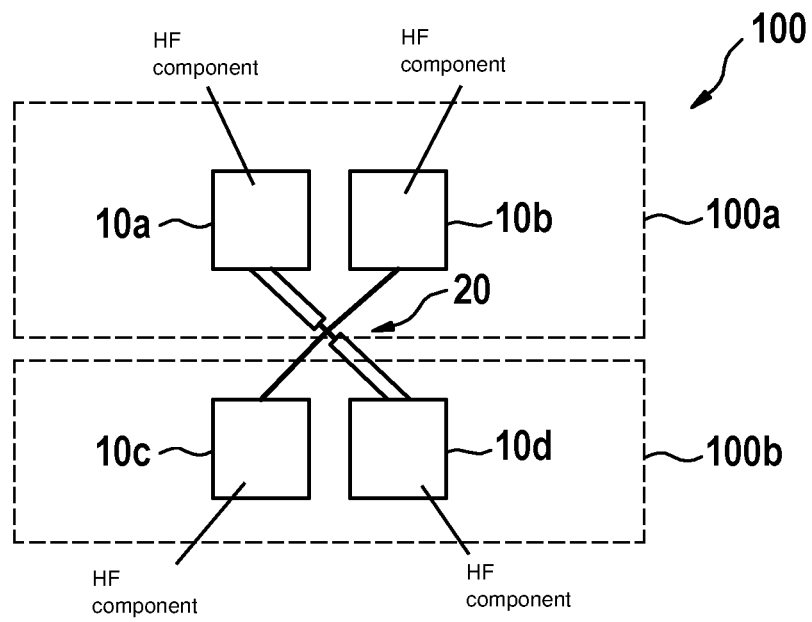
FIG. 1 shows a schematic representation of an example radar sensor system in accordance with the present invention.

In the figures, the same constructive elements have been provided with matching reference numerals.

DETAILED DESCRIPTION OF EXAMPLE EMBODIMENTS

Current radar sensors generally have many HF channels for generating and receiving radar waves. All HF components are able to be operating at the same time during a normal operation.

Given a symmetrical design, such radar sensors are able to be subdivided into a plurality of sub-sensors. Each sub-sensor may thus have a corresponding share of HF components or HF channels of the radar sensor. In this way, for example, a sub-sensor of the radar sensor may allow for autonomous driving of a vehicle at a restricted speed in a potential emergency operation. This is also able to be realized when components of other sub-sensors are no longer operative.

The development of the radar sensor system may be made up of conventional cost-effective basic components, for instance. By parallelizing multiple components of the same type, the capacity and the accuracy of the radar sensor system is able to be improved. A redundancy for the purpose of providing a reliable function of the system may additionally be realized by using a plurality of components of the same type. This makes it possible to implement an emergency operation of the radar sensor system in a technically uncomplicated manner. Toward this end, however, redundancy must be available not only with regard to the HF components and the microcontrollers, but also in the clock pulse generation. The HF components may be antenna controls or amplifiers developed in the form of MMICs (monolithic microwave integrated circuit), for example.

The radar sensor system has high coherence because a common clock pulse generator supplies all HF components with a usable or base frequency. More specifically, the different HF components are able to be operated at an identical operating frequency so that a redundant and coherent clock pulse supply of a plurality of HF components is able to be realized.

Preferably, at least a portion of the HF components used in the radar sensor system is able to be supplied with a clock pulse or a usable frequency. During a normal operation, at least one clock pulse generator is able to supply all HF components or antenna controls of the radar sensor system with the same clock pulse so that all data are thus able to be offset against one another.

During a normal operation of the radar sensor system, at least one clock pulse generator simultaneously supplies a clock pulse to all antenna controls or HF components. The clock pulse supply via one source makes it possible to realize a high coherence of all HF components of the radar sensor system. If a clock pulse generator exhibits a defect, for example, then it is possible to activate or connect at least one further clock pulse generator for generating an HF signal via the control unit.

Generally, one component in a radar sensor system is assigned the role of the master, which assumes the high frequency generation and supplies the other HF elements with the HF synchronization signal. The HF synchronization signal is required in order to provide a high coherence of HF elements 10a . . . 10d so that a high angular resolution of radar sensor system 100 is possible. The related art uses specialized components for the generation of the high frequency and for the further signal processing.

However, in view of the ever increasing development costs of HF components, e.g., with higher mask costs for smaller node sizes, it has become obvious that the use of multiple components of the same type may provide cost advantages despite the actual silicon surface being greater. In this way, the present invention provides the advantageous possibility of realizing a cost-effective and redundant radar sensor system.

It is provided in this context to realize both a redundancy and a self-supply concept for radar sensor system 100. One of the HF components has a self-supply so that a failure of a sub-sensor is able to be compensated for by the other sub-sensor and vice versa.

It is not decisive which HF component in the respective sub-sensor has a self-supply. Of importance is only that one HF component in a sub-sensor features a self-supply. In the example, the self-supply relates at least to the HF line (LO line). However, it may also be possible to optionally provide a clock pulse and/or trigger line for synchronization network 20, for instance.

FIG. 1 shows a schematic representation of such a provided radar sensor system 100 in accordance with an example the present invention. Radar sensor system 100 has four HF components 10a . . . 10d, which are developed as MMICs. The number four is only an example, and provided radar sensor system 100 could also have fewer or more than four HF components. In addition, a synchronization network 20 can be seen to which all HF components 10a . . . 10d are functionally connected and which is used for synchronizing the HF operating frequency of all HF components 10a . . . 10d.

It can be seen that the two ("master-capable") HF components 10a, 10d able to feed in the HF signal are connected to two lines of synchronization network 20, which means that a defined feedback of power to the infeeding HF component takes place. In this way, two master-capable HF components 10a, 10d are made available in radar sensor system 100, but only a single component functions as the master HF component at a defined point in time of the normal operation, while the remaining three other HF components function as slave HF components.

Because of the possibility of subdividing radar sensor system 100 into two autonomously operable sub-sensors 100a, 100b, it is therefore possible, for instance, that a reduced functionality of entire radar sensor system 100 still remains to a certain extent in the event of a fault. A functionality of entire radar sensor system 100 is considerably increased in conjunction with all HF components. This advantageously improves the safeguarding against a failure of entire radar sensor system 100, and the radar-technical basic functions of 'transmitting' and 'receiving' are carried out both by the master HF component and a slave HF component.

In addition, radar sensor system 100 includes antenna controls of HF components 10*a* . . . 10*d*. For the sake of simplicity, additional components of HF components 10*a* . . . 10*d* required for the emitting and receiving of radar waves such as antennas, amplifiers, oscillators etc. are not shown in the figures.

Figure 2:
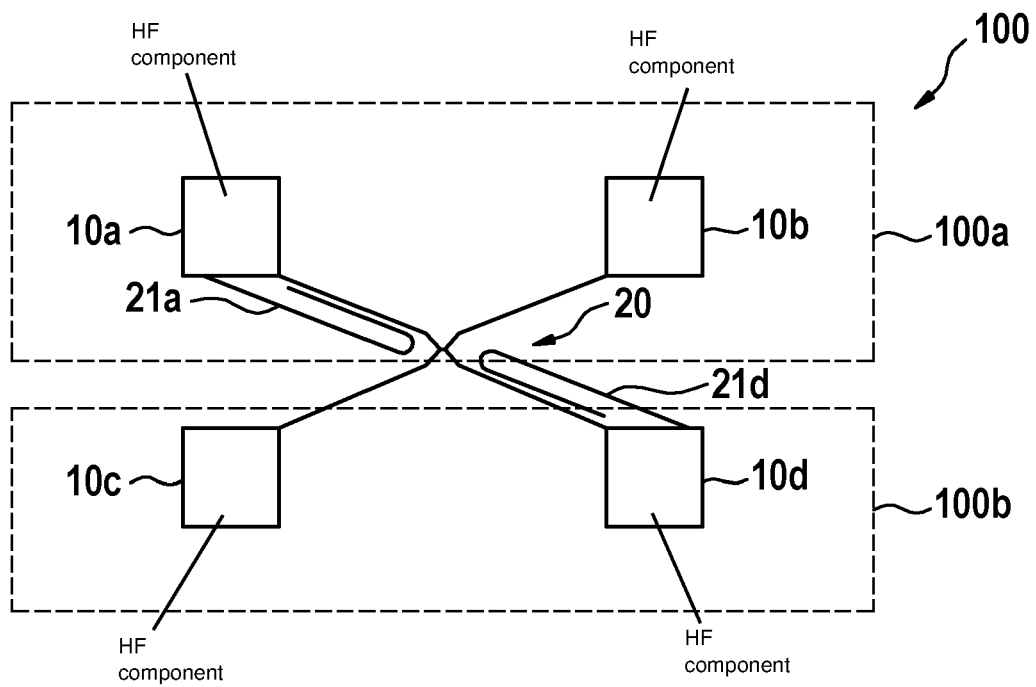
FIG. 2 shows a more detailed schematic representation of the radar sensor system from FIG. 1.

One possible realization of the radar sensor system from FIG. 1 is shown in greater detail in FIG. 2. A small portion of the signal power (e.g., −10 dB) is able to be fed back by HF components 10*a*, 10*d* (this is just an example, it may also be HF components 10*b*, 10*c*), because the HF input (LO input) of the mentioned HF components requires 14 dB less input power than supplied by the outputs, for example.

One disadvantage of the system from FIG. 2 may be the HF supply of the slave HF component, i.e., the particular HF component that does not supply the HF signal. If the same HF component is used as the HF input in the master and in the slave case, then the HF power does lie at −10 dB below the TX power value in the master case, but at −18 dB in the slave case, as may be inferred from the following FIG. 3, meaning that the power would normally not be sufficient.

However, if two ports are able to be both an HF transmitter and an HF receiver, as is possible with current HF components, then the HF input ports are changed from the master to the slave case, and the input power of −8 dB below the transmission power is sufficient again for the supply of all ports, power losses being considered in addition in all cases. However, the ratio of output power to HF input power is ultimately correct in this provided approach.

It can be seen that in the configuration of radar sensor system 100 of FIG. 2, a coupling structure is used for the feedback of power, this feedback of power to respective HF component 10*a*, 10*d* taking place at a given point in time either via coupling device 21*a* or 21*d*. This makes it possible for all HF components connected to synchronization network 20 to receive a defined measure of power from the HF signal. This aids in a symmetrical power distribution, which facilitates a high-performance operation of radar sensor system 100.

Figure 3:
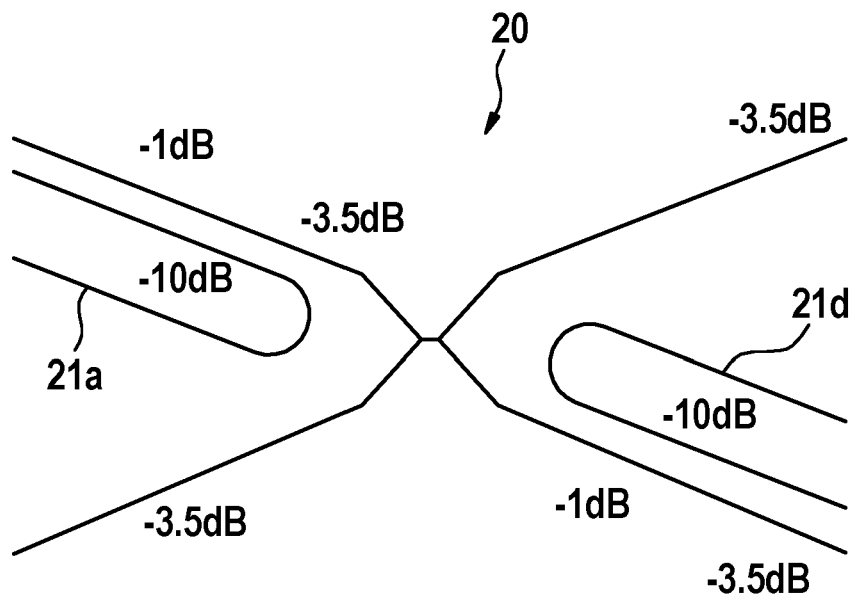
FIG. 3 shows a schematic representation of a synchronization network including damping values in accordance with an example embodiment of the present invention.

FIG. 3 shows situations of synchronization network 20 on the basis of damping values in dB, which relate to a signal power of the fed-in HF signal. Visible are coupling devices 21*a*, 21*d*, through which −10 dB output power is able to be fed back to HF component 10*a*, 10*d*. In addition, it can be seen that −3.5 dB losses occur per arm of synchronization network 20. This ultimately has the result that damping of approximately −8 dB is achieved by HF component 10*a*, 10*d*, functioning as the master, to other HF components 10*b*, 10*c*. To be gathered is an exemplary loss of power of −1 dB, the loss in particular being a function of the material and the length of the line.

Figure 4:
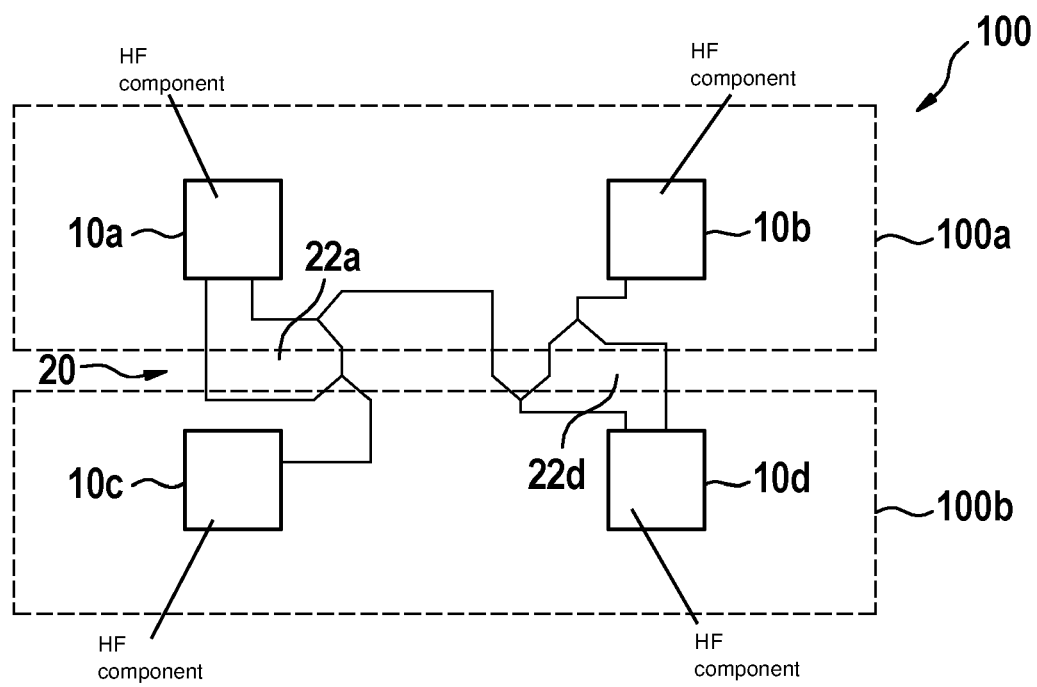
FIG. 4 shows a schematic representation of a further embodiment of an example radar sensor system in accordance with an example embodiment of the present invention.

FIG. 4 shows another embodiment of provided radar sensor system 100 in accordance with the present invention. In this case, synchronization network 20 includes divider devices 22*a*, 22*d*, which are made up of T-divider elements and are provided for the feedback of power of the HF signal. When suitable transmission coefficients are used for the T-divider elements, it is possible to provide a uniform HF distribution for all HF components. In this configuration as well, it can be seen that the two HF components 10*a*, 10*d* capable of feeding in the HF signal are provided with two feed lines in each case, the two feed lines being realized by divider devices 22*a*, 22*d*. In a normal operating case, only one of HF components 10*a*, 10*d* functions as the master HF component. In the configuration of FIG. 4, radar sensor system 100 is also able to be functionally subdivided into two autonomously operable sub-sensors 100*a*, 100*b*.

Which one of the mentioned feedback devices from FIG. 2 or FIG. 4 is used for the feedback of signal power depends on the structural conditions of radar sensor system 100, in particular on production-related possibilities of synchronization network 20. It is possible, for example, that divider devices 22*a*, 22*d* (e.g., hollow conductors in the form of a hollow conductor network) from FIG. 4 are easier to produce than coupling devices 21*a*, 21*d* from FIG. 2. Both divider devices and coupling devices are advantageously able to be realized in hollow conductor networks.

In the previous observations, the self-supplied HF components in radar sensor system 100 were always used across the diagonal.

The specific reason for this is that a balanced system of the transmitters of the HF components is then obtained if "normal" HF transmission channels are used for the HF withdrawal and infeed. In this way, a self-supplied HF component "loses" not only one transmitter but two (HF components 10*a*, 10*d*).

Figure 5:
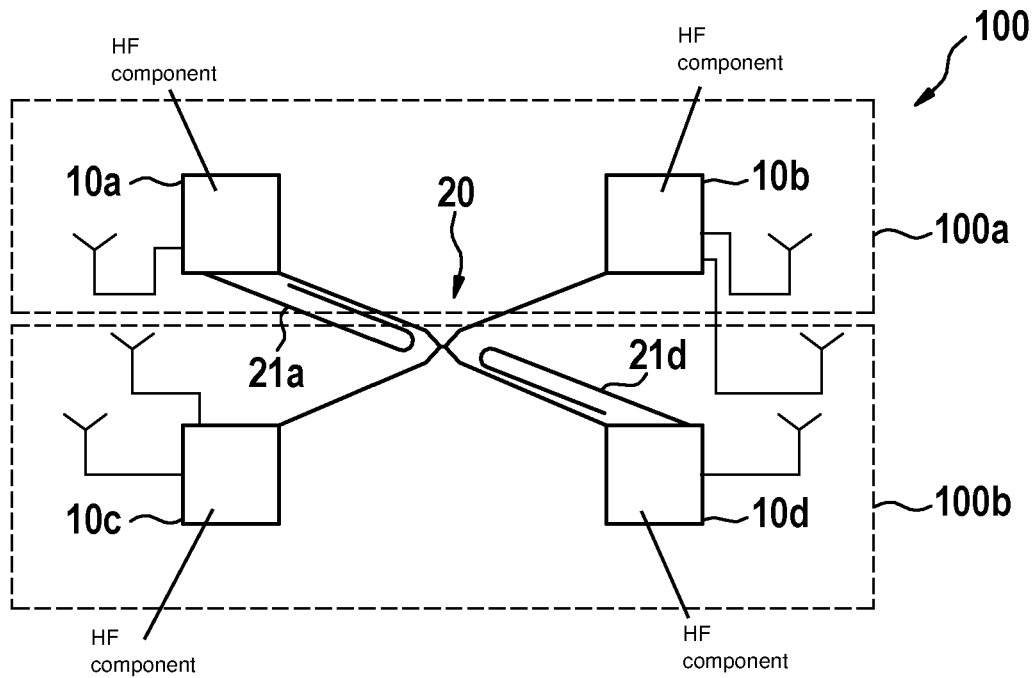
FIG. 5 shows a schematic representation of a further example embodiment of a radar sensor system in accordance with the present invention.
Figure 6:
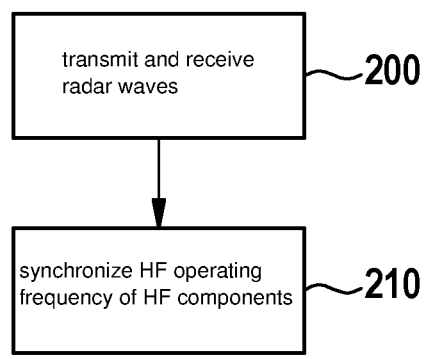
FIG. 6 shows a basic flow diagram of an example method for operating a radar sensor system in accordance with the present invention.

If the self-supplied HF components 10*a*, 10*d* of radar sensor system 100 are now placed across the diagonal as illustrated in FIG. 5, then a total of three transmission channels is able to be realized on each side of radar sensor system 100 (HF component 10*a*: one transmission channel, HF component 10*c*: two transmission channels, HF component 10*b*: two transmission channels, HF component 10*d*: one transmission channel).

It is of course understood that the configuration of FIG. 5 relates to specific embodiments of HF components and is therefore only an example, in particular with regard to the number of transmission channels.

An HF component functioning as the master assumes a plurality of the following tasks during a normal operation of radar sensor system 100:

the frequency generation using PLL (e.g., 77 GHz) and possibly a clock pulse generation (e.g., 50 MHz)

the output and amplification of the HF synchronization signal in part, the supply of the transmission signal the mixing into the baseband possibly, an AD conversion and output of the digital signals.

Generally, the first two tasks are exclusively assumed by the master HF component, and the three latter tasks are assumed by all involved HF components 10*a* . . . 10*d* of radar sensor system 100.

The example method is advantageously able to be used not only in a radar sensor system but also in any product that encompasses a plurality of HF components. The provided radar sensor system is preferably used in the automotive sector.

FIG. 3 shows a basic flow diagram of an example method in accordance with the present invention for operating a radar sensor system 100.

In a step 200, the transmitting and receiving of radar waves using a defined number of HF components 10*a* . . . 10*n* is carried out with the aid of at least one antenna in each case.

In a step 210, a synchronization of an HF operating frequency of HF components 10*a* . . . 10*n* takes place with the aid of a synchronization network 20, which is connected to HF components 10*a* . . . 10*d*, only a single HF component 10*a* . . . 10*d* feeding an HF signal into synchronization network 20 at a defined instant, and HF component 10*a* . . . 10*d* feeding in the HF signal returning a defined share of power of the HF signal to itself with the aid of a self-supply device 21*a*, 21*d*; 22*a*, 22*d*.

The example method is advantageously able to be implemented in the form of a software which is running in a control unit (not shown) of radar sensor system 100. This advantageously supports a simple modifiability of the present method.

One skilled in the art is therefore able to realize also embodiments that were not described or only partly described herein without departing from the core of the present invention.

What is claimed is:

1. A radar sensor system, comprising:
a defined number of HF components, each of the HF components having at least one antenna for transmitting and/or receiving radar waves, and at least one antenna control for operating the at least one antenna; and
a synchronization network to which all of the HF components are functionally connected and via which an HF signal is supplied to all of the HF components;
wherein at least two of the HF components have a self-supply device configured to feed back into the at least two of the HF components a defined share of power of the HF signal fed into the synchronization network, the HF signal for all of the HF components being generated and fed into the synchronization network, at a defined instant, by only a single HF component of the HF components having the self-supply device and operated as a master HF component; and
wherein the radar sensor system is functionally subdivided into at least two autonomously operable sub-sensor systems, wherein the HF components having the self-supply device being non-simultaneously operated master HF components, each of the HF components having the self-supply device being situated in a different one of the sub-sensor systems together with at least one respective one of the HF components operated as a slave component, and wherein when one of the HF components having the self-supply device is operated as a master HF component, the other(s) of the HF components having the self-supply device is operated as a slave HF component.

2. The radar sensor system as recited in claim 1, wherein at least one of the following is provided to all of the HF components using the synchronization network: a trigger signal, a clock pulse signal.

3. The radar sensor system as recited in claim 1, wherein the self-supply device is a coupling device.

4. The radar sensor system as recited in claim 1, wherein the self-supply device is a divider device.

5. The radar sensor system as recited in claim 4, wherein the divider device is a hollow conductor network.

6. The radar sensor system as recited in claim 1, wherein the HF components include ports, the ports of the HF components are configurable as either HF transmission ports or HF receiving ports.

7. A method for operating a radar sensor system, comprising the following steps:
transmitting and receiving radar waves using a defined number of HF components using at least one antenna in each case; and
synchronizing an HF operating frequency of all of the HF components using a synchronization network which is connected to the HF components, only a single HF component feeding an HF signal into the synchronization network at a defined instant, and the single HF component feeding in the HF signal into the synchronization network returning a defined share of power of the fed HF signal to itself using a self-supply device;
wherein the radar sensor system is functionally subdivided into at least two autonomously operable sub-sensor systems, wherein the HF components having the self-supply device being non-simultaneously operated master HF components, each of the HF components having the self-supply device being situated in a different one of the sub-sensor systems together with at least one respective one of the HF components operated as a slave component, and wherein when one of the HF components having the self-supply device is operated as a master HF component, the other(s) of the HF components having the self-supply device is operated as a slave HF component.

* * * * *